No. 825,721. PATENTED JULY 10, 1906.
W. C. HARTMANN.
CENTRIFUGAL LIQUID SEPARATOR.
APPLICATION FILED JULY 28, 1904.
3 SHEETS—SHEET 2.
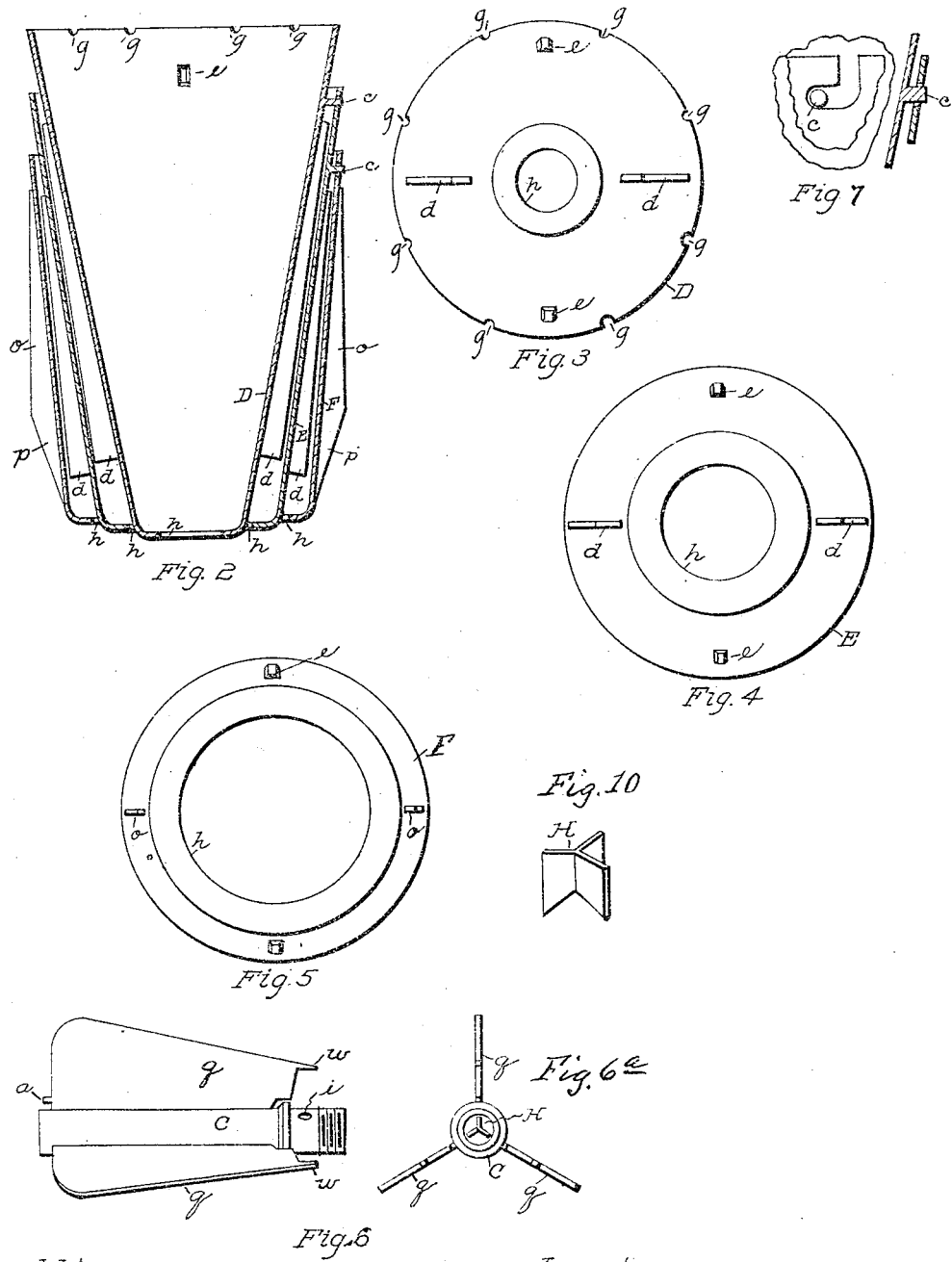
Witnesses:
Cecile F. King.
Florence A. Johnson.
Inventor.
William C. Hartmann
Per Clark C. Wood
Attorney.

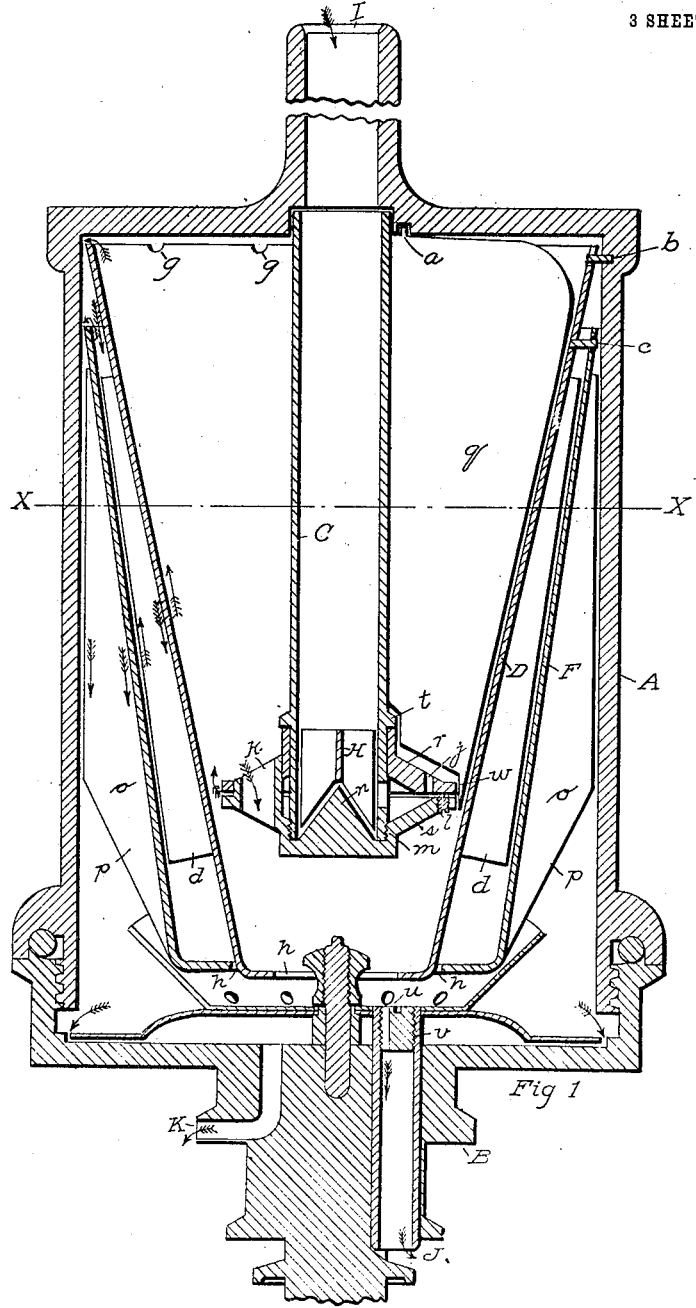

No. 825,721. PATENTED JULY 10, 1906.
W. C. HARTMANN.
CENTRIFUGAL LIQUID SEPARATOR.
APPLICATION FILED JULY 28, 1904.

3 SHEETS—SHEET 3.

Witnesses:
Cecil F. King.
Florence A. Johnson.

Inventor.
William C. Hartmann
Per. Clark P. Wood
Attorney.

UNITED STATES PATENT OFFICE.

WILLIAM C. HARTMANN, OF LANSING, MICHIGAN, ASSIGNOR TO THE OMEGA SEPARATOR COMPANY, OF LANSING, MICHIGAN, A CORPORATION OF MICHIGAN.

CENTRIFUGAL LIQUID-SEPARATOR.

No. 825,721.　　　　Specification of Letters Patent.　　　　Patented July 10, 1906.

Application filed July 28, 1904. Serial No. 218,564.

*To all whom it may concern:*

Be it known that I, WILLIAM C. HARTMANN, a citizen of the United States, residing and having my post-office address at Lansing, in the county of Ingham and State of Michigan, have invented new and useful Improvements in Skimming Devices for Centrifugal Liquid-Separators, of which the following is a specification.

My invention relates to that form of centrifugal liquid-separators in which the liquid to be separated is admitted at the top and drawn off at the bottom; and the object of my invention is to produce a bowl-filler for that class of separators which shall be rapid and efficient in its operation and free from clogging by means of cream or dirt. I attain these purposes by the mechanism shown in the accompanying drawings, in which—

Figure 8:
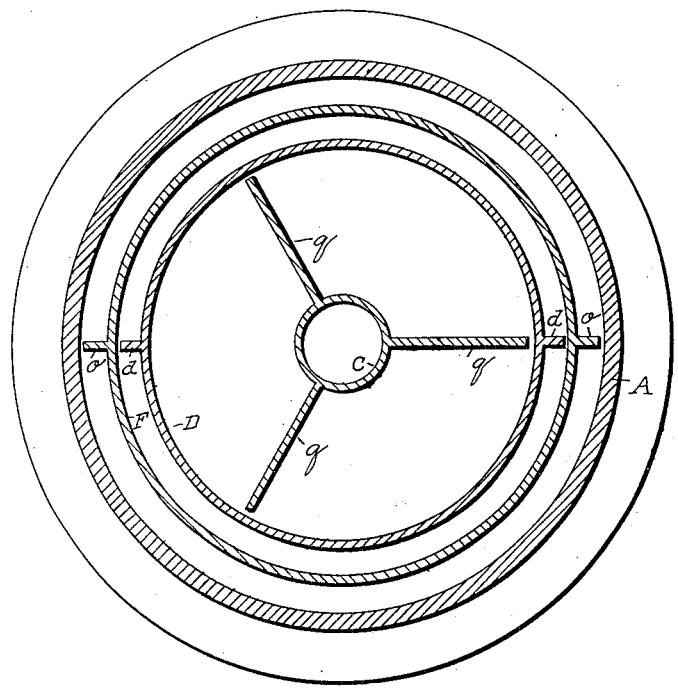
Figure 9:
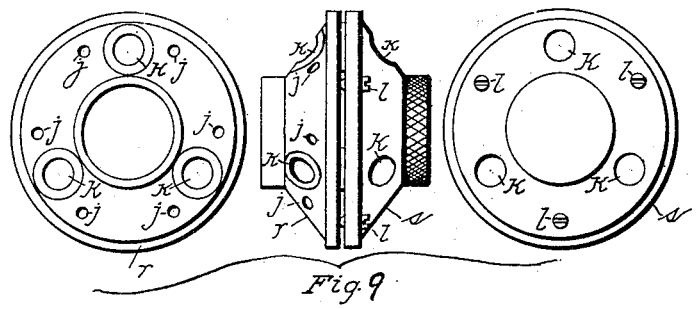

Figure 1 is a vertical section of a separator-bowl containing my device. Fig. 2 is a vertical section of a modified form of the separating-partitions. Fig. 3 is a plan view from below of the interior partition D. Figs. 4 and 5 are similar views of the partitions E and F, respectively. Fig. 6 is a perspective of the milk-admitting tube. Fig. 6ª is a plan view of the same from below. Fig. 7 is a detail of the means by which the different separating-partitions are fastened together. Fig. 8 is a cross-section of Fig. 1 on the line X X. Fig. 9 is a detail view, in plan and edge view, of the milk-regulating device shown in vertical section in Fig. 1. Fig. 10 is a perspective view of the triangular milk-distributing diaphragm.

In the drawings, A represents a separator-bowl, which may be of any ordinary type, adapted to receive the milk at the upper end and discharge it at the lower. I prefer, however, to use the form of bowl and false bottom shown in Letters Patent No. 621,306, dated March 14, 1899, to C. L. Kneeland and William C. Hartmann. A series of separating frusto-conical partitions D and F, as shown in Figs. 1 and 2, are arranged to fit closely inside of the bowl. On the outside of the partition F are two or more milk-steadying vanes of the form shown in Fig. 1, the lower extremity being preferably cut off at an angle. The outer edge of the vane exactly fits the interior of the bowl. To the exterior surface of each of the partitions are also attached two or more vanes $d$ of such a shape as to exactly fit the interior of the partition next outside of them, coming to an end a short distance from the bottom, as shown at $d$. The partitions may be as numerous as desired, both being employed in Fig. 2 and only one of them, D, in Fig. 1. Inside of the interior partition is placed a milk-admission tube C, to which are attached two or more vanes $q$, as shown in Fig. 9, three being shown in the drawings and being preferred by me. The interior partition D is secured in its place and compelled to revolve with the bowl by a pin (shown in Fig. 1) which fits into a notch in the top edge of the partition. The exterior partitions are secured to those exterior by pins which fit into locking-notches, as shown in Fig. 8, the purpose of this construction being so that the entire system of partitions may be withdrawn together from the bowl when the bottom B is removed. The milk-admission tube C is compelled to revolve with the bowl by means of the pins $a$, fitting into a hole in the top of the bowl, as shown in Fig. 1.

A triangular milk-distributing diaphragm H is inserted in the milk-admission tube in its lower extremity, the purpose of which will be more fully explained hereinafter. On the lower extremity of the milk-admission tube is secured a regulating device for insuring an even regular supply of milk to the bowl. This, as shown in Figs. 1 and 9, consists of an upper disk $r$, which is adapted to slip on the lower end of the milk-tube until it is stopped by a ledge or ring $t$. Openings K allow of the passage of the cream that collects about the central tube. A series of holes $j$ are also drilled in this disk, serving as vents. The lower disk is fitted with a screw, so as to screw on the lower end of the milk-tube C, as shown in Fig. 1, but is kept from coming into close contact with the disk $i$ by means of adjusting-screws $l$. By this adjustment of the distance between the two disks the supply of milk to the bowl is regulated. The other features of this device will be better explained in connection with the operation of the mechanism.

I prefer to make each of the interior partitions a little longer than the partition exterior to it, as shown in Fig. 2; but this is not essential to my invention. I also prefer to make each interior partition of a somewhat higher degree of taper than the partition interior to it, so that the space between any two successive partitions will be greater at the bottom than it is at the top, as shown in Fig. 2. By this means the descending current of cream is more completely separated from the ascending current of skimmed milk. I also find it advantageous to extend the vanes $q$, as shown at $w$ in Figs. 1 and 6, so as to cross the space between the disks $r$ and $s$ or the opening of the tubes $f$.

In using my device the milk is admitted to the separator-bowl through the tube I, passing downward in the direction indicated by the arrows. It passes downward to the bottom of the tube C, when it is given the motion of the bowl by the distributing-diaphragm H and escapes through the openings $i$ and the space between the disks $r$ and $s$ or the tubes $f$ into the interior of the partition D and passes over the upper edge of that partition until the bowl is filled with milk. The milk in the bowl is compelled to revolve with the bowl and remain perfectly steady by the vanes $q$, $d$, and $o$. As soon as this condition is reached the separation of the cream from the milk begins.

As soon as the milk escapes from the milk-admission tube the skim-milk, being heavier than the cream, begins to separate from it under the influence of the centrifugal force and goes to the outer part of the inner partition D and forms an ascending current along the interior wall of the partition, passing to the top of the partition and escaping through the openings $g$ into the interior of the bowl. At the same time the current of cream displaced by the heavier milk collects in a ring around the outside of the tube C and passes down through the openings K and the opening $h$ in the partition D, into the partition D, into the cream-pool at the bottom of the bowl, from which it escapes through the slotted cream-screw $v$ and the tube J into the cream-receptacle. The milk being partially separated in this way, as already stated, passes into the part of the bowl exterior to the partition D and starts downward. The milk then passes into the space between the partitions D and E, where the process already described as taking place in the partition D is repeated. An additional portion of the cream is displaced by the heavy milk and forced inward and downward along the outside of the partition D until it escapes through the opening $h$ in this partition into the cream-pool. At the same time an ascending current of milk is formed along the inner wall of the partition surrounding the partition D, which comes up to the top and escapes again into the interior of the bowl. Again passing downward it is caught by the partition F, when the process is again repeated. As stated in describing the construction, as many of these partitions as it is deemed proper may be employed, each of them removing an additional portion of cream from the milk, which all passes downward into the cream-pool and escapes through the cream-tube J. The skim-milk from which the last vestiges of cream have been removed passes down along the interior wall of the bowl in the direction indicated by the arrows to the bottom of the bowl, from which it escapes in the manner described in Letters Patent No. 621,306, dated March 14, 1899, to C. L. Kneeland and William C. Hartmann, already referred to.

What I claim is—

1. In a milk-admitting device for centrifugal separators, in combination, a milk-tube, a milk-regulating disk removably attached thereto and having openings therethrough, a second regulating-disk adapted to be removably attached to said milk-tube facing said first disk and having holes adapted to receive the cream-tubes of the first disk with means for regulating the distance of said disks apart.

2. In a milk-admitting device for centrifugal separators, in combination, a milk-tube, a milk-regulating disk removably attached thereto and having openings therethrough, a second regulating-disk adapted to be removably attached to said milk-tube facing said first disk and having holes adapted to receive the cream-tubes of the first disk with means for regulating the distance of said disks apart, said milk-tube being provided with a stop for the adjacent disk.

3. In a milk-admitting device for centrifugal separators, in combination, a milk-tube, a milk-regulating disk removably attached thereto and having openings therethrough, a second regulating-disk adapted to be removably attached to said milk-tube facing said first disk and having holes adapted to receive the cream-tubes of the first disk with means for regulating the distance of said disks apart, and a milk-distributing diaphragm in the lower end of said milk-tube.

4. In a milk-admitting device for centrifugal separators, in combination, a milk-tube, a milk-regulating disk removably attached thereto and having openings therethrough, a second regulating-disk adapted to be removably attached to said milk-tube facing said first disk and having holes adapted to receive the cream-tubes of the first disk with means for regulating the distance of said disks apart, a milk-distributing diaphragm in the lower end of said milk-tube, and vertical milk-steadying vanes attached to said milk-tube.

5. In a milk-admitting device for centrifugal separators, a milk-tube, a triangular milk-distributing diaphragm removably inserted in the lower end thereof, and a two-part regulating device removably supported on the lower end of the milk-tube, and means for regulating the distance of said two parts apart.

6. In a milk-admitting device for centrifugal separators, a milk-tube, a triangular milk-distributing diaphragm removably inserted in the lower end thereof, and a two-part regulating device removably supported on the lower end of the milk-tube, and means for regulating the distance of said two parts apart, said milk-tube being provided with exterior milk-steadying vanes.

7. In a milk-admitting device for centrifugal separators, a milk-tube, a triangular milk-distributing diaphragm removably inserted in the lower end thereof, and a two-part regulating device removably supported on the lower end of the milk-tube, and means for regulating the distance of said two parts apart, said milk-tube being provided with exterior milk-steadying vanes, said vanes being provided with openings at their upper ends.

In testimony whereof I have signed my name to this specification in the presence of two subscribing witnesses.

WILLIAM C. HARTMANN.

Witnesses:
  C. C. WOOD,
  HARRY A. SILSBEE.